United States Patent [19]

Santandrea et al.

[11] Patent Number: 5,383,618
[45] Date of Patent: Jan. 24, 1995

[54] MACHINE AND METHOD FOR WINDING TWO-POLE STATORS

[75] Inventors: Luciano Santandrea; Massimo Lombardi, both of Firenze, Italy

[73] Assignee: Axis S.p.A., Florence, Italy

[21] Appl. No.: 196,713

[22] Filed: Feb. 15, 1994

Related U.S. Application Data

[62] Division of Ser. No. 911,126, Jul. 9, 1992, Pat. No. 5,316,228, which is a division of Ser. No. 579,606, Sep. 10, 1990, Pat. No. 5,149,000, which is a division of Ser. No. 306,618, Feb. 6, 1989, Pat. No. 4,969,606.

[30] Foreign Application Priority Data

Mar. 10, 1988 [IT] Italy .................. 67196 A/88

[51] Int. Cl.⁶ ............................................. H02K 15/02
[52] U.S. Cl. ................................................ 242/1.10 R
[58] Field of Search ........................ 242/1.1 R, 1.1 E; 29/605, 596

[56] References Cited

U.S. PATENT DOCUMENTS

| | | | |
|---|---|---|---|
| 3,648,938 | 3/1972 | Dryburgh | 242/1.1 R |
| 4,000,764 | 1/1977 | Reiger, Jr. | 140/113 |
| 4,483,433 | 11/1984 | Fischer et al. | 198/339 |
| 4,679,312 | 7/1987 | Nussbaumer et al. | 29/596 |
| 4,713,883 | 12/1987 | Santandrea et al. | 29/736 |
| 4,732,338 | 3/1988 | Eminger et al. | 242/1.1 R |
| 4,969,606 | 11/1990 | Santandrea et al. | 242/1.1 R |
| 5,149,000 | 9/1992 | Santandrea et al. | 242/1.1 R |
| 5,207,745 | 5/1993 | Santandrea | 242/1.1 R |

FOREIGN PATENT DOCUMENTS 2091668A 8/1982 United Kingdom ...... H02K 15/095

*Primary Examiner*—Katherine Matecki
*Attorney, Agent, or Firm*—Fish & Neave

[57] ABSTRACT

A machine for winding two-pole stators includes a revolving table around which are located at least three working stations: a station to feed the machine with unwound stators from a conveyor placed alongside the machine and for returning the wound stators to the conveyor; a winding station where one or more winding needles with alternating translatory and angular motion wind the stator; and a terminating station with means to anchor the coil leads to the stator. The revolving table carries a plurality of circumferentially spaced stator housings, each stator housing having stator-containing means. The stator housings and table are equipped with mechanical, reciprocally meshing means, those on the table being located between the winding station and the load/unload station for rotating the stator housings about the horizontal axis tangentially to the table between a position in which the axis of the stator-containing means is vertical and a position in which that axis is horizontal. The stator housings further include a spring to keep the axis of the associated stator-containing means horizontal during movement of the housings from the load/unload station through the winding station to the terminating station.

6 Claims, 9 Drawing Sheets

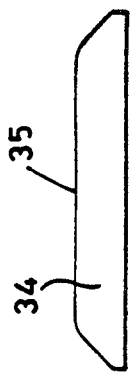
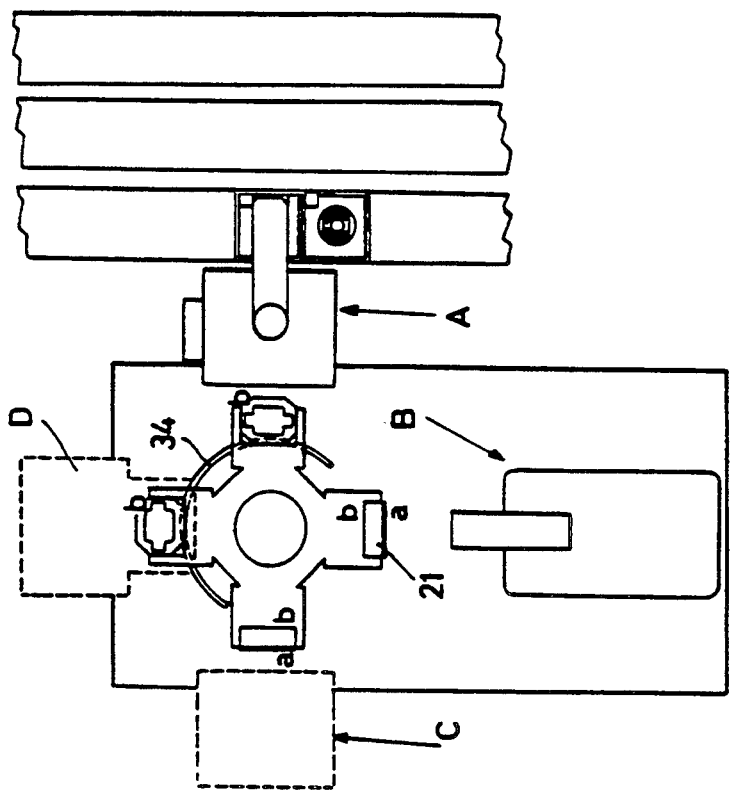
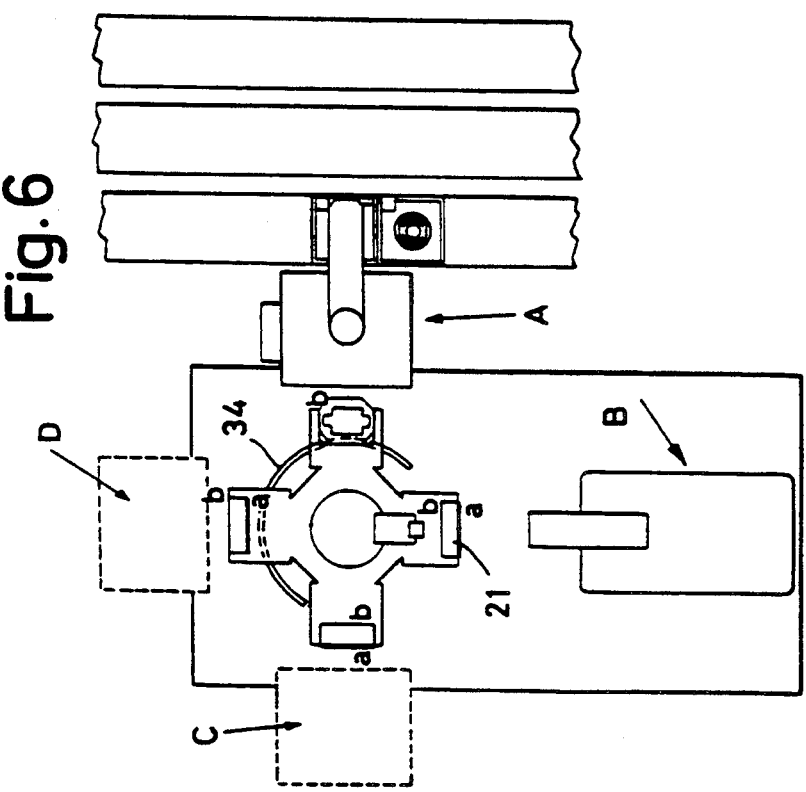

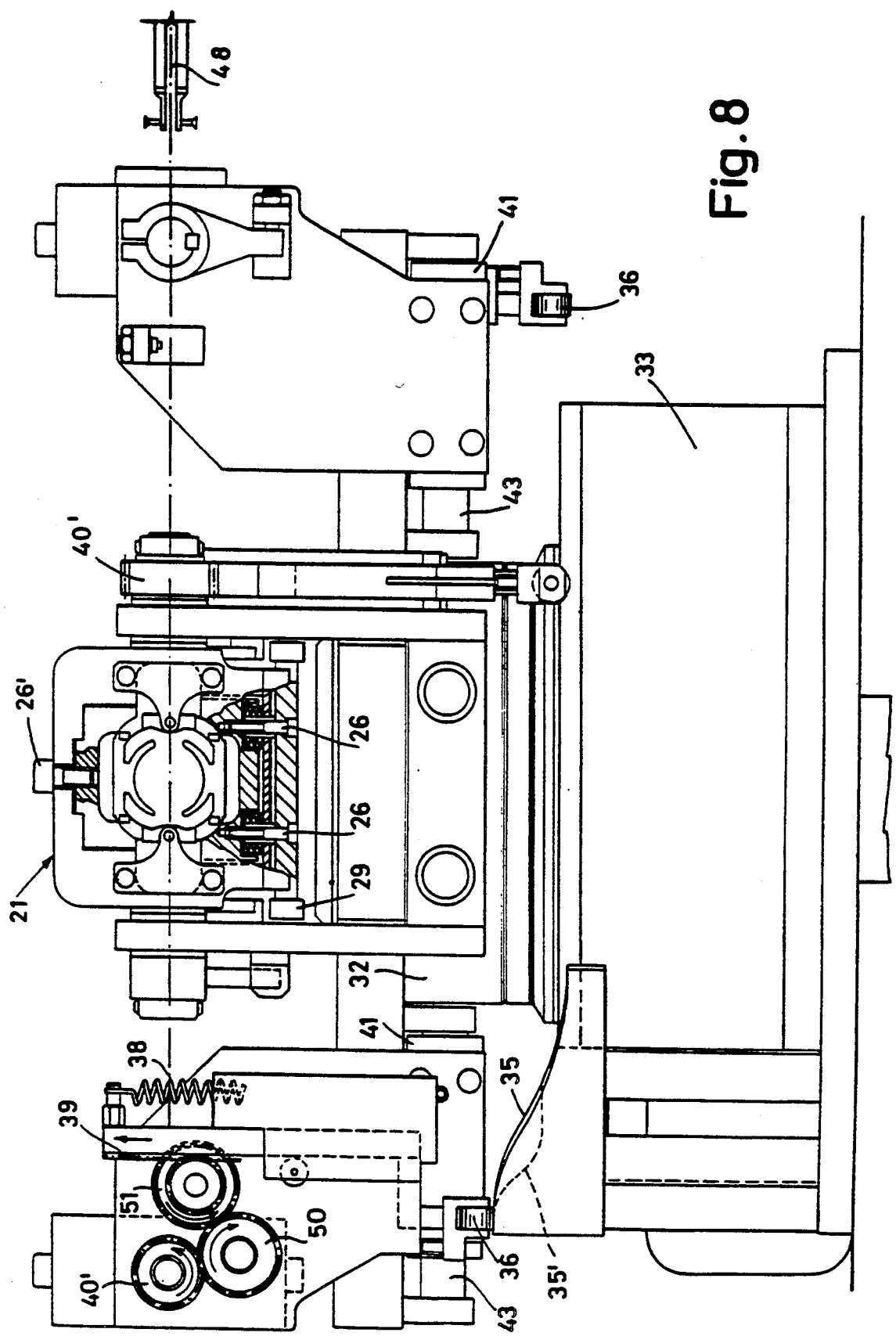

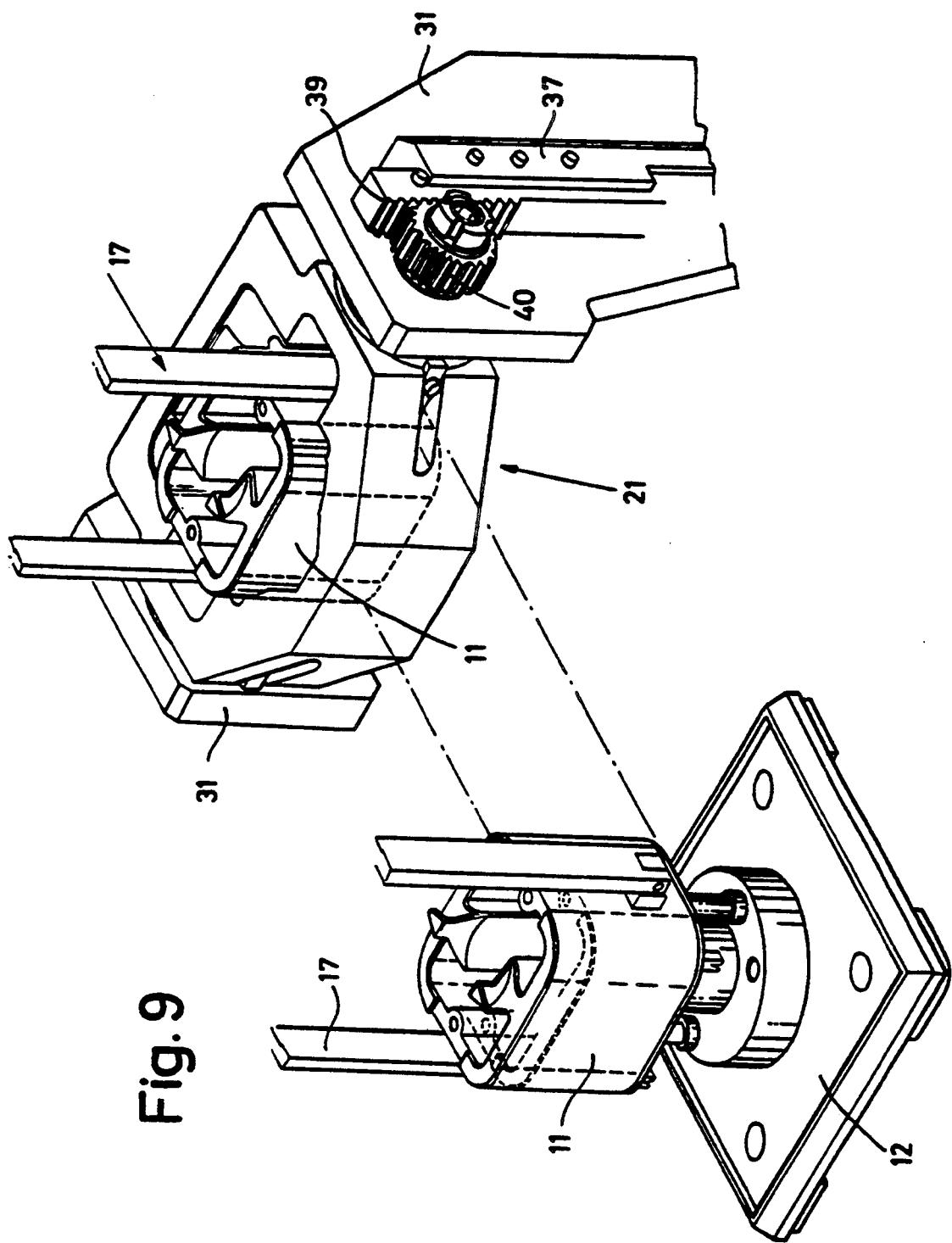

MACHINE AND METHOD FOR WINDING TWO-POLE STATORS

This is a division of application Ser. No. 07/911,126, filed Jul. 9, 1992 (now U.S. Pat. No. 5,316,228) entitled MACHINE FOR WINDING TWO-POLE STATORS, which was a division of application Ser. No. 07/579,606, filed Sep. 10, 1990 (now U.S. Pat. No. 5,149,000), which was a division of application Ser. No. 07/306,618, filed Feb. 6, 1989 (now U.S. Pat. No. 4,969,606).

BACKGROUND OF THE INVENTION

This invention relates to machines for winding two-pole stators for electric motors. In particular, the invention relates to machines for winding two-pole stators which do not employ wire-guiding winding forms, thereby permitting changeover from one stator type to another with a minimum of work.

It is an object of this invention to provide a machine fed from a conveyor system for completely automated winding of stators within a very short cycle time.

It is another object of this invention to provide a very reliable and flexible machine, i.e., a machine able to wind stators of various stack diameters and stack heights.

These and other objects of the invention are accomplished by providing a two-pole stator winding machine including a table mounted on a base for rotation about a vertical axis. Spaced from one another around the table are at least three working stations. These are (1) a station for feeding the machine with unwound stators from a conveyor placed alongside the machine and for subsequently returning the wound stators to said conveyor; (2) a winding station where one or more winding needles with alternating translatory and angular motion provide for winding each stator; and (3) a terminating station including means for anchoring the coil leads to the stator. The revolving table has stator housings fitted to it at distances related to the distances between the working stations. Each stator housing includes stator-containing means. The stator housings and table are equipped with mechanical, reciprocally meshing means, those on the table being located between the winding station and the load/unload station for rotating the stator housings about their horizontal axis which is tangential to the table between a position in which the axis of the stator-containing means is vertical and a position in which that axis is horizontal. The stator housings further include a spring to keep the housings in the position in which the axis of the associated stator-containing means is horizontal during motion of the table from the load/unload station through the winding station and to the terminating station.

Further features of the invention, its nature and various advantages will be more apparent from the accompanying drawings and the following detailed description of the preferred embodiments.

BRIEF DESCRIPTION OF THE DRAWINGS

FIG. 3 is rotated 180° relative to FIG. 2.

FIG. 4 is taken in the opposite direction from FIG. 1.

FIGS. 6 and 7 are plan view layouts of two different embodiments of the machine.

FIGS. 6a and 7a are surface developments of two details of FIGS. 6 and 7, respectively.

FIG. 8 is an alternative embodiment of the table shown in FIG. 4.

FIG. 9 is a perspective view showing a pallet and a stator housing at the load/unload station.

DETAILED DESCRIPTION OF THE PREFERRED EMBODIMENTS

Figure 1:
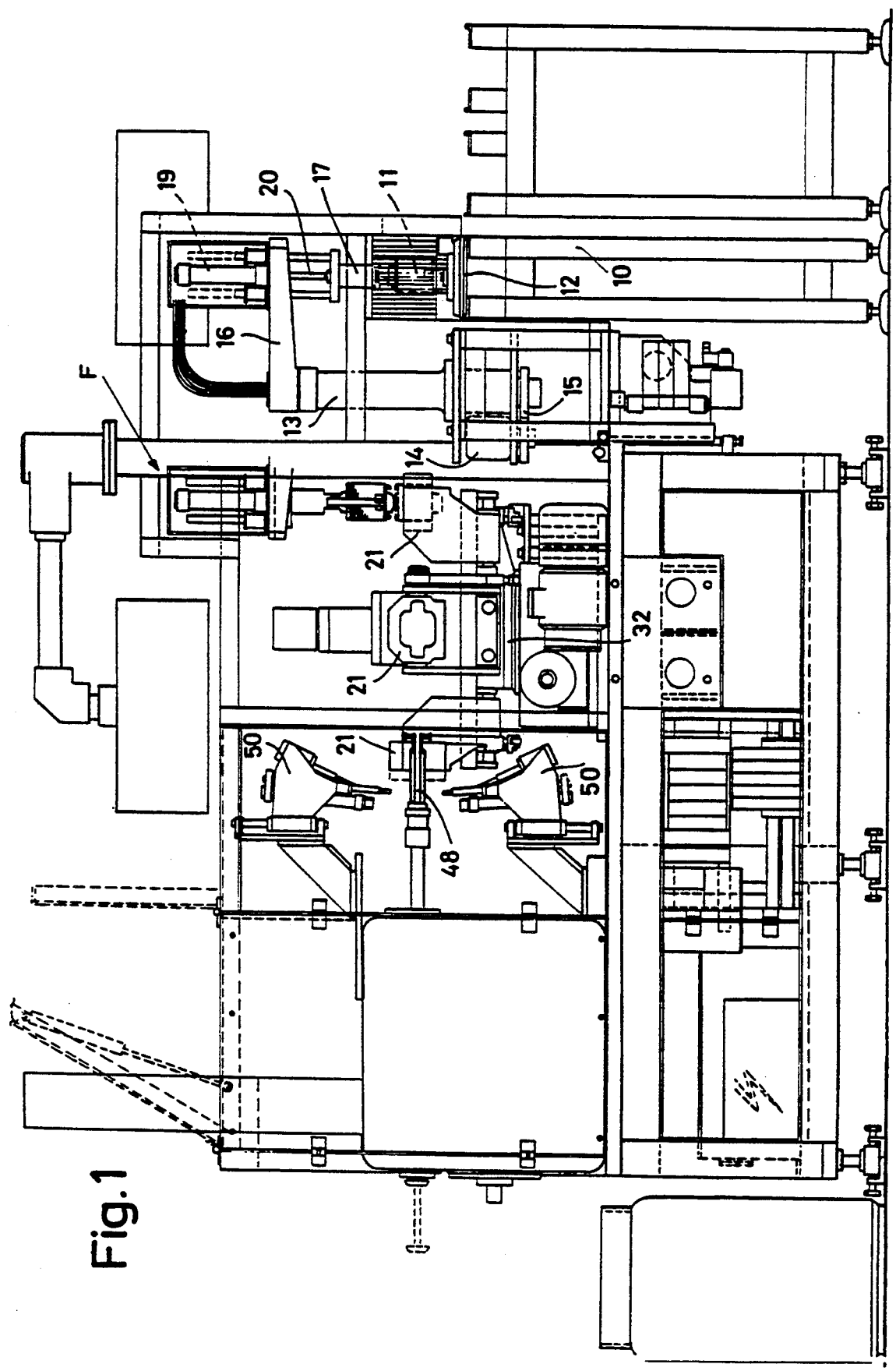
FIG. 1 is a side elevational view of a first embodiment of the invention in which the machine includes only one terminating station.
Figure 2:
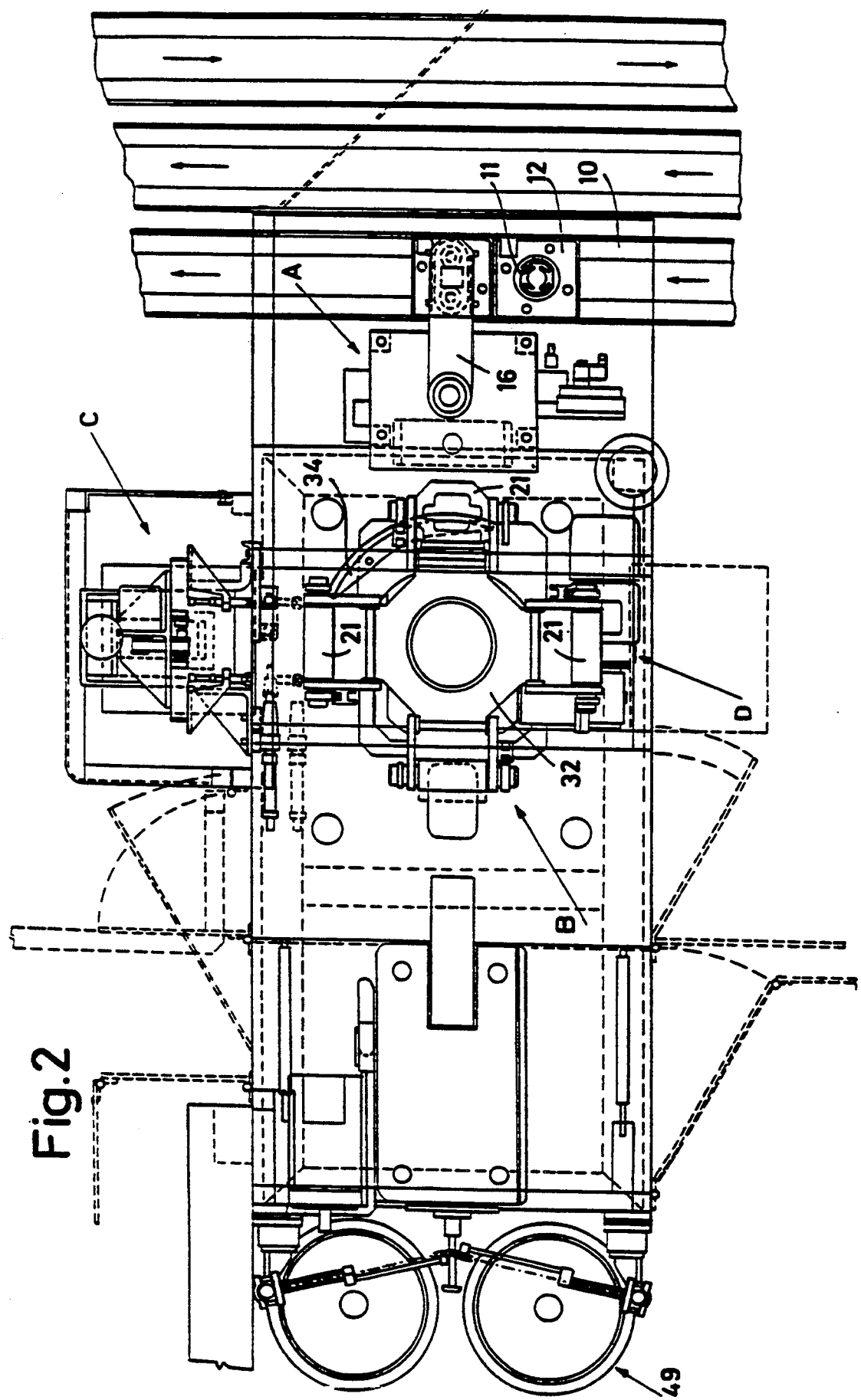
FIG. 2 is a top view of the machine of FIG. 1.

As shown in FIGS. 1 and 2, a transport system 10 located at one side of the machine carries stators 11 on pallets 12. Next to conveyor 10 is a first working station indicated at A in FIG. 2. Station A is a load/unload station including a column 13 rotatable about a vertical axis by means of pneumatic cylinder 14 and gear 15. Column 13 carries arm 16 having a vertically slidable gripper 17. Gripper 17 is moved downward by means of pneumatic cylinder 19 with its shaft 20. After gripping stator 11, gripper 17 moves up. Column 13 then rotates 180° to bring gripper 17 and stator 11 into the position shown by arrow F in FIG. 1.

Figure 3:
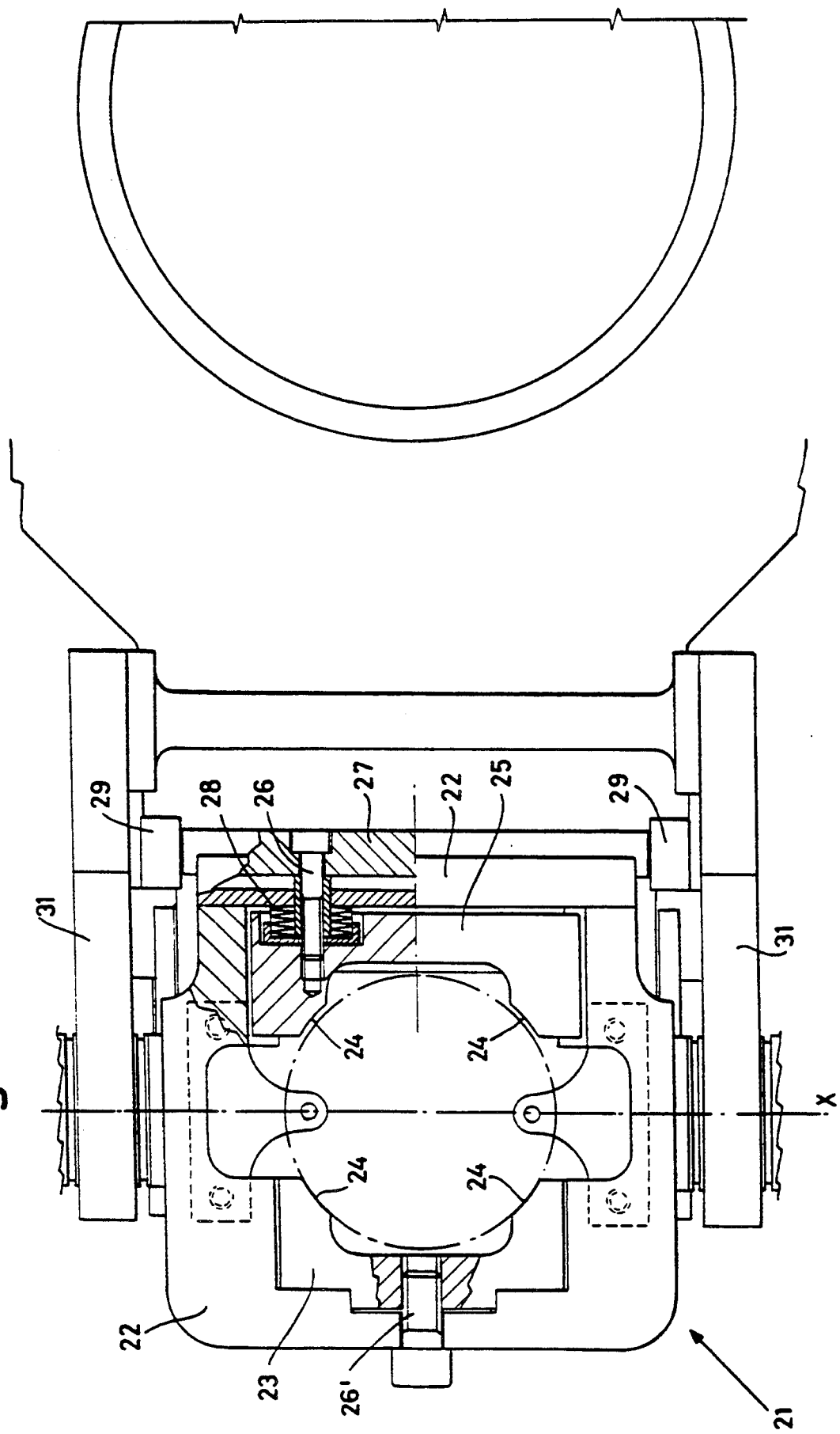
FIG. 3 is a top view, partly in section, of a stator housing fitted to the machine of FIGS. 1 and 2.

A stator housing 21 under gripper 17 (better seen in FIGS. 3 and 4) has an outer body 22. Fixed to one side of outer body 22 by screw 26' is a half-chuck 23 having inner sidewalls 24 defining an arc of a circle for engaging stator 11. On the opposite side, half-chuck 25 is fixed by screw 26 to transverse rod 27. Around screw 26, springs 28 are compressed between outer body 22 and half-chuck 25. By unscrewing screws 26 and 26', half-chucks 23 and 25 can be quickly removed and replaced with others having different inner sidewalls 24 for stators with different stack diameters.

Rod 27 ends in rollers 29 slidable along surfaces 30 (FIG. 5) formed as circular arcs. The axis of arcs 30 is parallel to but not coincident with the pivotal axis X by which housing 21 is pivotally mounted to support 31.

Figure 10:
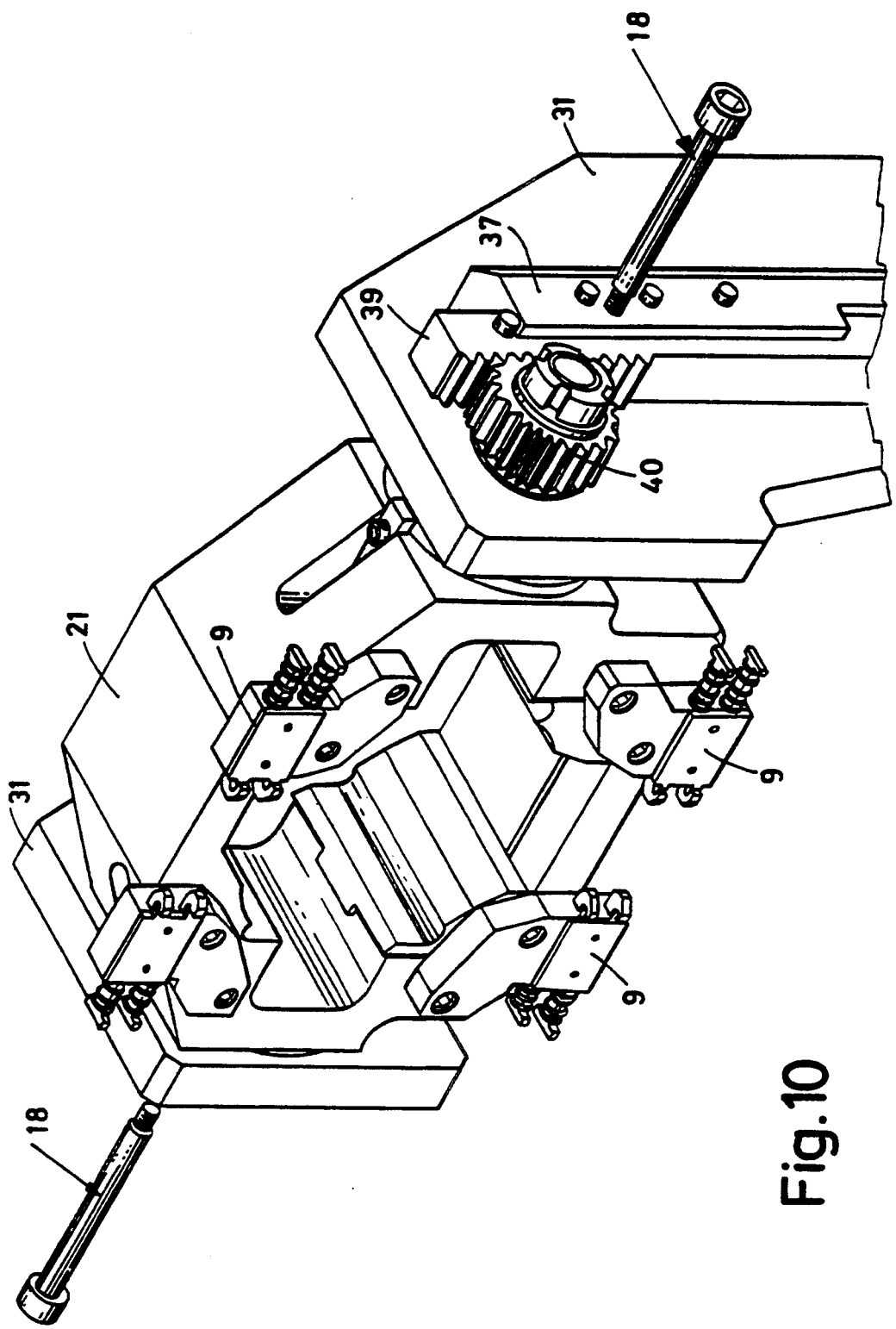
FIG. 10 is a perspective view showing a partially disassembled stator housing.

As shown in FIG. 10, each stator housing 21 can be rapidly removed and replaced by unscrewing just two screws 18 and pulling the housing up and out. This operation may be necessary when the stators to be wound require different lead holding claws 9. In such cases, removal and replacement of both half-chucks and of claws 9 would take more time than replacing the whole stator housing 21 by unscrewing two screws 18.

Supports 31 are connected to rotatable table 32 carrying four stator housings 21 identical to the one previously described. Housings 21 are located 90° apart on table 32, and the table is fitted to a thrust bearing and indexed through 90° at each step, driven by conventional motor means (not illustrated).

The stationary base 33 (FIG. 4) of table 32 carries a vertical circular curved plate 34 for a portion of its circumference between load/unload station A and the last working station (FIG. 2). Plate 34 has a curvilinear upper surface 35 with its section increasing toward the load/unload station. Surface 35 is the running surface of roller 36 fixed to bar 37, which in turn is vertically slidable and pushed downwards by spring 38.

Bar 37 carries rack 39 which engages gear wheel 40 integral with the pivot pin of the axis X about which stator housing 21 is pivotable. In this way, when roller 36 runs along surface 35, the associated stator housing 21 rotates from the position shown in the center and on the right side of FIG. 4 (in which the stator is held with its axis horizontal) to the position shown on the left side of FIG. 4 (in which the stator is carried with its axis vertical) to facilitate loading and unloading of stators 11 in housings 21 by gripper 17. FIG. 9 shows that, with stator housing 21 turned with its axis vertical and with the gripper arms vertical, gripper 17 is able to transfer stators with different stack heights between pallet 12 and stator housing 21 without the need to adjust either the gripper or the housing. Another advantage is that stator 11 reaches its proper position on pallet 12 and inside stator housing 21 by gravity, without the need to adjust any of the apparatus, thereby reducing production costs.

Figure 4:
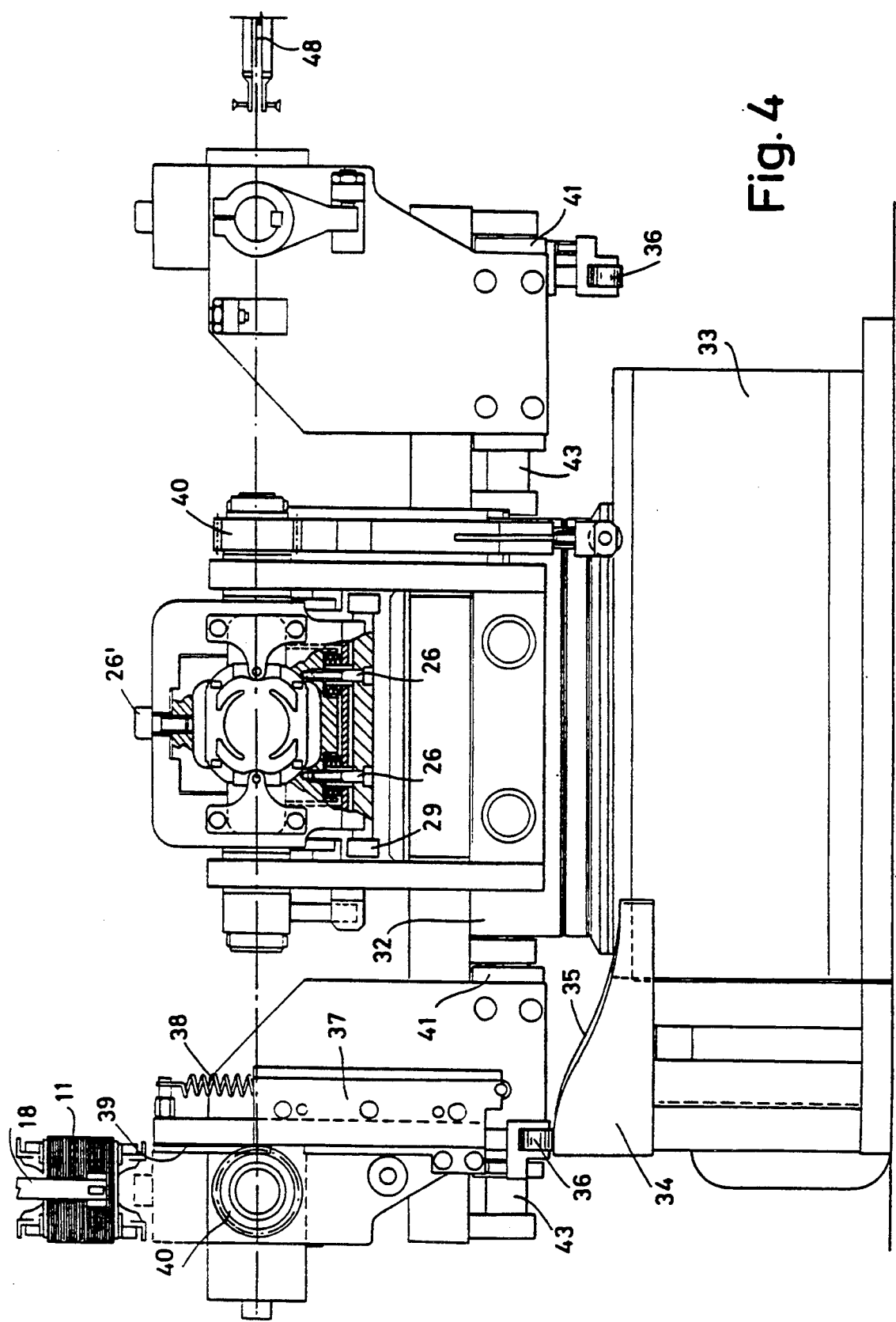
FIG. 4 is a front view of the revolving table of the machine of FIGS. 1 and 2, including the stator housings shown in FIG. 3.
Figure 5:
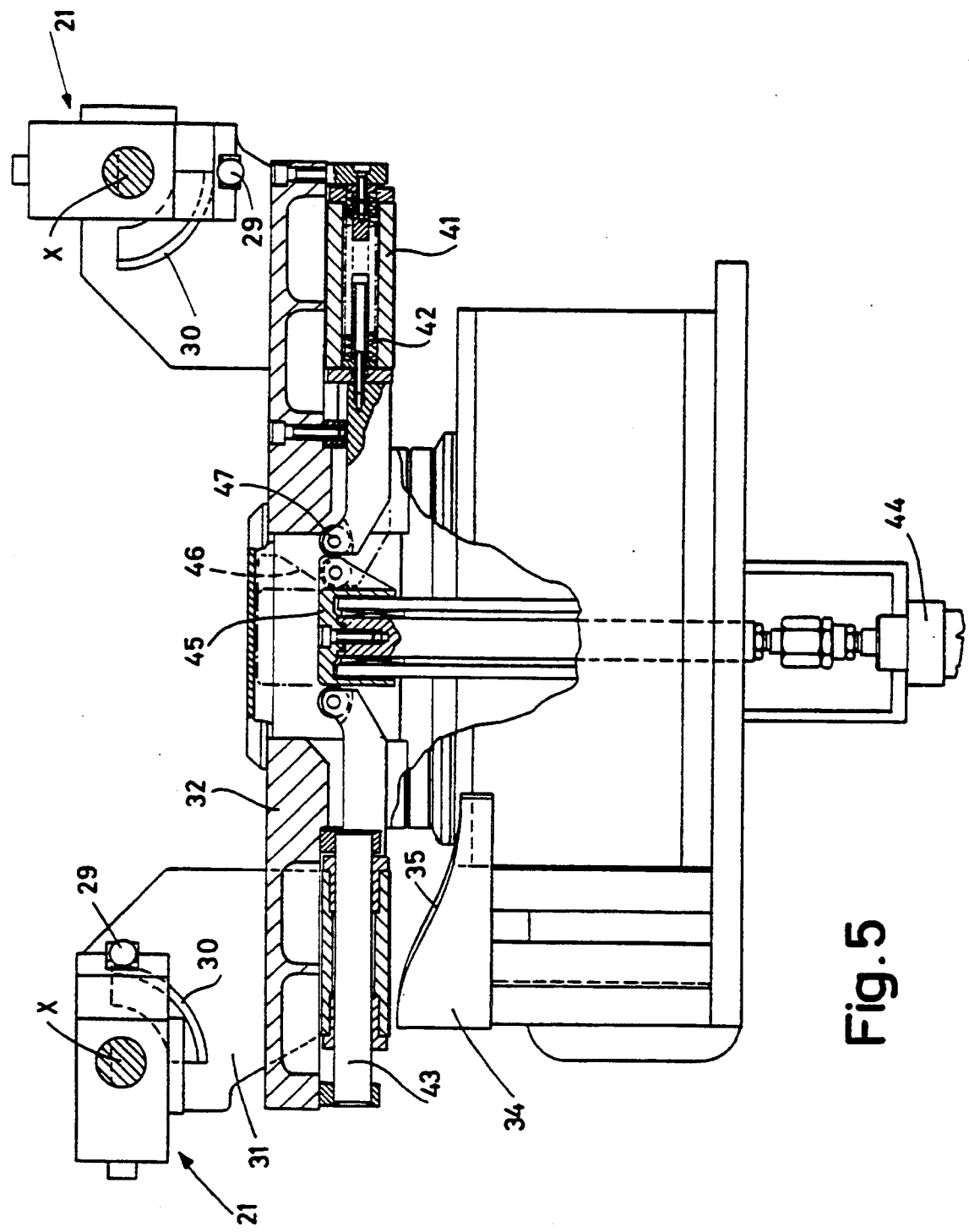
FIG. 5 is a partly sectional front view of the table of FIG. 4.

As shown in FIGS. 4 and 5, the supports 31 of each stator housing 21 are fixed to sliders 41 which move on radial rods 43. Springs 42 maintain supports 31 toward the central vertical rotation axis of table 32. Cylinder 44, having the same axis as the rotation axis of table 32, carries a rod 45 on the end of which is fixed an appendage that has an inclined sidewall 46 (FIG. 5) projecting at the side opposite to the load/unload station. After each 90° indexing of table 32, cylinder 44 retracts rod 45 so that inclined surface 46 goes from the position shown in dashed lines in FIG. 5 to the position shown in full lines, thereby pushing the slider 41 associated with the stator housing 21 adjacent winding station B away from the center of table 32 as roller 47 slides along inclined surface 46. In this way, as shown in FIGS. 1 and 2, the stator housing adjacent winding station B is pushed toward winding station B where one or more winding needles 48 wind stator 11 inside stator housing 21.

The kinematic system 49 (FIG. 2) moving needles 48 will not be explained in detail here, nor will the cutting means 50 (FIG. 1) which cut off the leads after winding, because the details of these elements do not concern the present invention.

Terminating station C (FIG. 2), where the coil leads are anchored to the stator, is situated between winding station B and load/unload station A, with the revolving table 32 indexing clockwise. Terminating station C has a terminating group moving along three axes, controlled by a step motor or a D.C. motor with encoder. The group has wire gripping means for catching the coil lead and putting it into the stator terminal. The gripping means are combined with crimping means for completing termination of the stator. Again, this station will not be described in detail because it does not concern the present invention.

As explained above, the machine includes a first station A for loading and unloading, with gripper 17 on column 13 which transfers stator 11 between the conveyor system and the stator housing with its half-chucks 23 and 25, said housing in said station having its axis vertical.

The stator inside stator housing 21 arrives at a second station D, which in the embodiment illustrated in FIG. 2 is a waiting or intermediate station, after a 90° rotation about its axis X, so that stator 11 (held by half-chucks 23 and 25) arrives with its axis horizontal. The half-chucks firmly grip stator 11, because from the moment when the stator housing starts to rotate about axis X, rollers 29 running on curved surface 30 release the force opposing the operation of springs 28 so that these springs can push half-chuck 25 toward half-chuck 23, thereby locking the stator inside the housing. The above-described rotation of housing 21 starts as soon as table 32 revolves clockwise and roller 36 leaves cam surface 35. Spring 38 then pushes sliding bar 37 downward, so that rack 39 rotates gear wheel 40 which is also the pivoting point of housing 21.

After another 90° indexing of revolving table 32, the stator housing 21 with the stator to be wound arrives at winding station B. Cylinder 44 then retracts its rod so that inclined sidewall 46 pushes slider 41 (together with housing 21) outward, thereby bringing the stator near the winding needles which now start winding the stator.

After the coils have been wound, revolving table 32 again indexes through 90°, bringing the stator inside the housing to terminating station C where the coil leads are anchored to the stator terminals.

A further 90° indexing of revolving table 32 brings the stator back to load/unload station A. Gripper 17 is pivoted over the stator, descends, grips the stator, and unloads it onto conveyer 10. During this last indexing of the table, roller 36, running along surface 35, had moved sliding bar 37 upwards. Rack 39 rotates gear wheel 40 so that housing 21 arrives at the load/unload station with the stator axis vertical. At the same time, rollers 29, running along surfaces 30, cause half-chuck 25 to be moved outward, unlocking stator 11.

An alternative embodiment is shown in FIG. 6 in which load/unload station A and winding station B are adjacent to one another, followed by two terminating stations C and D. This arrangement can be especially advantageous for stators with intermediate taps which require two successive terminating operations on the same stator.

FIGS. 6 and 6a concern a first embodiment as described above in which the stator leaves winding station B with the coil leads held by claws 9 (FIG. 10) on stator housing 21. After a 90° indexing of revolving table 32, the wound stator arrives at the first terminating station C where the coil leads coming from stator face a are taken out of the claws and terminated on the stator. Then the revolving table 32 indexes again through 90° and brings the stator from terminating station C to the second terminating station D. Roller 36 runs over a first section 35 (FIG. 6a) of cam 34 similar to the one shown in FIG. 4. However, in this embodiment, gear wheel 40' (FIG. 8), acting as the pivoting point of housing 21, instead of directly engaging rack 39 does so by way of gear wheels 50 and 51. As a result of this gear transmission, the housing 21 rotates through 180° on its way from the first to the second terminating stations, where the leads on stator face b are terminated.

After operation of second terminating station D, revolving table 32 indexes again through 90° to bring the stator from the second terminating station to load/unload station A. During this last indexing, roller 36 runs over the second section 35' of cam 34 (FIG. 6a). Gear wheels 40', 50, and 51 rotate the stator housing through 90°, so that the stator arrives at the load/unload station with its axis vertical.

Another embodiment with two terminating stations is shown in FIG. 7. After terminating coil leads on stator face a at terminating station C, revolving table 32 indexes through 90° and brings the stator housing to terminating station D. In this embodiment the stator housing 21 is the same as shown in FIG. 4, with rack 39 engaging only one gear wheel 40. As shown in FIG. 7a cam 34 permits only a 90° rotation of the stator housing, presenting stator face b, with the stator axis vertical at terminating station D, and maintaining that orientation of the stator housing through load/unload station A. The terminating group of station D is accordingly located above the stator housing and carries out the same operations for anchoring the leads to stator face b as at station C. After termination at station D, the revolving table indexes again through 90° and brings the stator to load/unload station A with the stator axis still vertical.

The advantage of the embodiment shown in FIG. 7 as compared to the embodiment shown in FIG. 6 is that it reduces machine dimensions at station D.

We claim:

1. A machine for winding a stator having a longitudinal axis, said machine comprising:
   a movable table for transferring the stator between a first station and a second station, wherein said first station is a stator winding station and said second station is a stator termination station;
   a stator support mounted on said movable table for receiving and holding a stator so that said stator can be wound with its longitudinal axis substantially horizontal, wherein said stator support includes a pair of opposing clamping members for releasably clamping said stator thereto, said clamping members being removable from said stator support;
   means for loading said stator between said opposing clamping members prior to winding said stator at said first station; and
   means for unloading said stator from said opposing clamping members after termination of said starer at said second station.

2. The machine defined in claim 1 wherein said stator support includes a spring for biasing at least one of said clamping members towards said stator for releasably clamping the stator.

3. The machine defined in claim 2 wherein said pair of opposing clamping members accommodates a stator having a first stator diameter, and wherein said pair of opposing clamping members is removable from said machine and replaceable with another pair of opposing clamping members that accommodates a stator having a second stator diameter.

4. The machine defined in claim 3 wherein said stator support accommodates any one of a plurality of stators having different stack heights without adjusting said stator supports.

5. A method for winding a stator having a longitudinal axis, said method comprising the steps of:
   providing a movable table for transferring a stator between a first station and a second station, wherein said first station is a stator winding station and said second station is a stator termination station;
   a stator support mounted on said movable table for receiving and holding a stator so that said stator can be wound with its longitudinal axis substantially horizontal, wherein said stator support includes a pair of opposing clamping members for releasably clamping said stator thereto, said clamping members being removable from said stator support;
   loading said stator between said opposing clamping members prior to winding said stator at said first station;
   winding said stator with at least one coil of wire at the winding station;
   transferring said wound stator from said winding station to said termination station;
   terminating said wound stator at said termination station; and
   unloading said stator from said opposing clamping members.

6. The method defined in claim 5 wherein said step of loading said stators includes the step of biasing at least one of said clamping members towards said stator for releasably clamping the stator.

* * * * *